United States Patent [19]

Miyasaka et al.

[11] Patent Number: 5,128,412
[45] Date of Patent: Jul. 7, 1992

[54] REMOVABLE ADHESIVE COMPRISING ACRYLIC MICROBALLS, ACRYLIC COPOLYMER AND CROSS-LINKER

[75] Inventors: Hiroyasu Miyasaka, Tanashi; Yasuaki Kitazaki, Iruma; Tetsuaki Matsuda, Kawagoe; Junichi Kobayashi, Tokorozawa, all of Japan

[73] Assignee: Nichiban Company Limited, Tokyo, Japan

[21] Appl. No.: 522,509

[22] Filed: May 14, 1990

Related U.S. Application Data

[63] Continuation of Ser. No. 226,558, Aug. 1, 1988, abandoned, which is a continuation of Ser. No. 798,862, Nov. 18, 1985, abandoned.

[30] Foreign Application Priority Data

May 15, 1985 [JP] Japan .................. 60-101548

[51] Int. Cl.$^5$ ............... C08L 33/02; C08L 33/08; C08L 33/10; C08L 33/12
[52] U.S. Cl. .................... 525/108; 525/125; 525/166; 525/179; 525/194
[58] Field of Search ............ 525/125, 108, 166, 179, 525/194

[56] References Cited

U.S. PATENT DOCUMENTS

| | | | |
|---|---|---|---|
| 3,691,140 | 9/1972 | Silver | 260/78.5 |
| 3,773,710 | 11/1973 | Victorius | 525/125 |
| 4,098,945 | 11/1978 | Oehmke | 525/127 |
| 4,415,697 | 11/1983 | Peng et al. | 525/125 |
| 4,468,493 | 8/1984 | Ishikura et al. | 525/125 |
| 4,565,730 | 1/1986 | Poth et al. | 525/125 |

FOREIGN PATENT DOCUMENTS 57-182373 11/1982 Japan .................. 525/125

Primary Examiner—Melvyn I. Marquis
Assistant Examiner—Robert E. L. Sellers, II
Attorney, Agent, or Firm—Foley & Lardner

[57] ABSTRACT

A removable adhesive composition comprising (i) 100 parts by weight of a copolymer (A) which is tacky at ordinary temperature, synthesized of 90 to 99.9% by weight of a nonfunctional vinyl type monomer (a) mainly composed of an acrylate or methacrylate ester having an alkyl group having 2 to 12 carbon atoms and 0.1 to 10% by weight of a functional vinyl type monomer (b) having one or more of a carboxyl group, a hydroxyl group, an amino group or an epoxy group in its molecule; (ii) 20 to 1,000 parts by weight of a copolymer (B) whose glass transition point is 10° C. or less and also having a mean particle diameter of 0.5 to 300 μm, synthesized of 90 to 99.9% by weight of a nonfunctional vinyl type monomer (a) mainly composed of acrylate or methacrylate ester having an alkyl group having 2 to 12 carbon atoms and 0.1 to 10% by weight of an α-monoolefinic carboxylic acid (c); and (iii) 0.01 to 5 parts by weight of a polyfunctional cross-linking agent (C) which is capable of reacting with the functional groups of said components (b) and (c), and the surfaces of said copolymer (B) being entirely covered with the copolymer (A).

The removable adhesive composition of this invention has excellent primary tack, adhesiveness and removability, and which, in particular, can be readily removed from an adherend without leaving any remanent adhesive composition on the adherend and also has excellent adhesiveness.

15 Claims, No Drawings

REMOVABLE ADHESIVE COMPRISING ACRYLIC MICROBALLS, ACRYLIC COPOLYMER AND CROSS-LINKER

This application is a continuation of application Ser. No. 226,558, filed Aug. 1, 1988 which is a continuation of application Ser. No. 798,862, filed Nov. 18, 1985, both now abandoned.

BACKGROUND OF THE INVENTION

This invention relates to a removable adhesive composition, more particularly to a removable adhesive composition having an acrylate or methacrylate ester series copolymer as a main component and having a pressure-sensitive adhesion performance at ordinary temperature.

As important properties required for an adhesive to be used in forming an adhesive tape or sheet which can be pressure sensitively adhered to an adherend at ordinary temperature and under ordinary conditions, there may be mentioned such properties as primary tack, adhesive force and cohesive force. It has also been known that an excellent adhesive may not be obtained unless the balance of these properties is maintained favorably.

Here, primary tack means the primary self-adhesive force which may simultaneously be exhibited at the moment when an adhesive comes into contact with an adherend. The higher the value of this tack is, the more favorable the adhesive may be. In order to allow an adhesive to exhibit high primary tack favorably, the adhesive is required to give increased areas which are capable of being in contact with an adherend as widely as possible within a shorter time and at lower pressure.

Adhesive force is a property which may be observed when an adhesive tape or an adhesive sheet coated with an adhesive is being removed from an adherend in at least a few seconds after the adhesive was in contact with the adherend. In general, the greater the contact area of an adhesive with an adherend is, the greater the adhesive force may be. The adhesive force may also change on the viscoelastic nature of the adhesive.

Cohesive force means the cohesiveness that an adhesive itself has, which is required to prevent the adhesive from remaining on the surface of an adherend with legginesses when the adhesive is removed therefrom. In many cases, the cohesive force of an adhesive can be determined by measuring the viscosity of the adhesive. As viscosity which may satisfy the condition not to cause the legginesses, there has been known a viscosity of $1 \times 10^6$ poise or more at ordinary temperature when removed at usual removing speed.

On the other hand, the adhesive force of an adhesive to a substrate is required to be always greater than that to an adherend so that the adhesive may not remain on the surface of the adherend. For this purpose, it has been often practiced that an adhesive is designed to exhibit a state that it roots in the substrate, i.e., the so-called anchor effect. It has been also practiced that a molecule constituting a substrate is allowed to be chemically bonded to a molecule constituting an adhesive.

As described above, there may be mentioned four points which are required for a removable adhesive capable of bonding to an adherend more strongly and removing therefrom without leaving any remanent adhesive; namely, high primary tack (primary self-adhesiveness); adhesive force to maintain an adhesive sheet in a state being bonded to an adherend as necessary; cohesive force that an adhesive may neither cause legginess nor remain on the surface of the adherend when removed; and that the adhesive force of the adhesive to a substrate is sufficiently greater than that to an adherend.

In order to impart to an adhesive such properties as primary tack, adhesiveness and removability at the same time, it is necessary for the adhesive to satisfy the above-described requisites with a favorable balance.

Japanese Provisional Patent Publication No. 2736/1975 discloses a body having structure wherein adhesive micro-balls comprising a copolymer formed by using water-emulsifiable alkyl acrylate esters and water-soluble ionic vinyl monomers such as sodium acrylate are bonded on a substrate with a binder in such a manner that the micro-balls may partially protrude from the surface of the binder. In this Publication, it is disclosed that by use of the adhesive micro-balls a series of excellent performance for the tacking, adhesion and removal, can be made. It is also described therein that the binder and the adhesive micro-balls need not be chemically bonded. As to the reason therefor, it is explained that transfer of the adhesive to an adherend may be effectively prevented by the physical socket effect.

Furthermore, such a type of adhesive micro-balls is also disclosed in U.S. Pat. No. 3,691,140 issued on Sep. 12, 1972, wherein the basic concept of the adhesive composition is the same as mentioned above and a water-soluble ionic monomer is employed. This ionic monomer is incorporated in a copolymer and plays a role of preventing particles from agglomeration during the course of suspension polymerization in water; on the other hand, it becomes a component which gives unfavorable influence on the adhesiveness of the adhesive micro-balls produced. Thus, it is difficult to obtain an adhesive which has favorable primary tack in the case where the water-soluble ionic monomer is employed.

SUMMARY OF THE INVENTION

An object of this invention is to provide a removable adhesive composition which has excellent primary tack, adhesiveness and removability, and which, in particular, can be readily removed from an adherend without leaving any remanent adhesive composition on the adherend and also has excellent adhesiveness.

The present inventors have made intensive studies on the fundamental principles in a series of the steps for the tacking, adhesion and removal as mentioned above to accomplish this invention.

The removable adhesive composition of this invention is characterized by comprising (i) 100 parts by weight of a copolymer (A) which is tacky at ordinary temperature, synthesized of 90 to 99.9% by weight of a nonfunctional vinyl type monomer (a) mainly composed of an acrylate or methacrylate ester having an alkyl group having 2 to 12 carbon atoms and 0.1 to 10% by weight of a functional vinyl type monomer (b) having one or more of a carboxyl group, a hydroxyl group, an amino group or an epoxy group in its molecule; (ii) 20 to 1,000 parts by weight of a copolymer (B) whose glass transition point is 10° C. or less and also having a mean particle diameter of 0.5 to 300 μm, synthesized of 90 to 99.9% by weight of a nonfunctional vinyl type monomer (a) mainly composed of an acrylate or methacrylate ester having an alkyl group having 2 to 12 carbon atoms and 0.1 to 10% by weight of an α-monoolefinic carboxylic acid (c); and (iii) 0.01 to 5 parts by weight of a polyfunctional cross-linking agent (C) which is capable of reacting with the functional groups of said components (b) and (c), and the surfaces of said copolymer (B) being entirely covered with the copolymer (A).

More particularly, this invention is most characterized by bonding a functional group to each molecule of the copolymer (A), which is an adhesive, and the copolymer (B), which is elastic micro-balls, and by further incorporating the cross-linking agent (C) which is capable of reacting with the functional group, whereby the adhesive and the micro-balls are chemically bonded to each other and also the adhesive and micro-balls are bonded to the substrate by chemical bond or by anchor effect to prevent effectively the adhesive composition from remaining on the adherend.

In the following, this invention will be described in greater detail.

The adhesive composition of this invention is useful as an adhesive for use in a removable adhesive sheet or tape. When applied to such use, the sheet and the like may be readily be adhered to an adherend with a slight pressure and also removed therefrom without damaging the surface of the adherend or leaving any remanent adhesive on the surface thereof.

Usually a pressure-sensitive adhesive sheet or tape can be readily adhered to various kinds of articles with a slight pressure and it may be again removed from and adhered to an adherend as necessary. However, in prior arts, the adherend is partially damaged or the surface of the adhesive is contaminated during repeated actions of removing and re-adhering, and thus, it has been possible only to produce tapes or sheets which may be lowered in its ability of re-adhering. Such phemonena are remarkably seen when an adhesive tape is adhered to a newspaper and subsequently removed therefrom or when an adhesive tape is adhered to a woven cloth and subsequently removed therefrom. In a conventional adhesive tape or sheet, it is scarcely possible to remove it from a newspaper without peeling off the paper fibers thereof. Even when the adhesive sheet which had been removed from the newspaper is re-adhered thereto, the pressure-sensitive adhesion performance of the sheet or the like has been almost lost since the fibers of newspaper had sticked over the surface of the adhesive.

The adhesive composition of this invention has solved all such conventional problems, and the constitution of the adhesive composition is as follows.

Since the adhesive component (i) in this invention is required to possess a removability, it must be rich in the primary tack and the cohesiveness. However, adhesive force may not be too strong.

As the non-functional monomer (a) which is the main constituent of the adhesive composition (i), there may be used an ester of an acrylic acid or a methacrylic acid having an alkyl group having 2 to 12 carbon atoms. More specifically, as the acrylate series esters, examples are ethyl acrylate, propyl acrylate, n-butyl acrylate, isobutyl acrylate, n-octyl acrylate, isooctyl acrylate, 2-ethylhexyl acrylate, nonyl acrylate, isononyl acrylate, lauryl acrylate, etc. and as the methacrylate series esters, examples are methyl methacrylate, ethyl methacrylate, propyl methacrylate, butyl methacrylate, 2-ethylhexyl methacrylate, isononyl methacrylate and lauryl methacrylate, etc.

As a non-functional vinyl type monomer (a), there may be used the above-mentioned acrylate ester or methacrylate ester singly, however 0.5 to 10% by weight of the ester may be replaced by other non-functional vinyl type monomers. Since such monomers are employed mainly for the purpose of controlling adhesiveness, they must not be employed in a large amount. Such other vinyl type monomers may include, for example, vinyl acetate, vinyl propionate, styrene, acrylonitrile, etc.

These non-functional vinyl type monomers may be used singly or in combination of two or more kinds thereof, and mixed in an amount of 90 to 99.9% by weight, preferably 95 to 99.5% by weight, of the monomers constituting the copolymer (A) which is an adhesive. In a case where the amount thereof is less than 90% by weight, an adhesive which has a high primary tack may not be obtained; on the other hand, when the amount is more than 99.9% by weight, the crosslinking strength between the adhesive and the elastic micro-balls or between the adhesive and the substrate may be lowered, thus resulting in failure of obtaining sufficient cohesive force.

As a functional vinyl type monomer (b) which is the other constituent of the adhesive composition (i), there may be used a vinyl type monomer having one or more of a carboxyl group, a hydroxyl group, an amino group or an epoxy group in its molecule.

Examples of the monomer having a carboxyl group are acrylic acid, methacrylic acid, itaconic acid, crotonic acid, maleic acid, etc. Example of the monomer having a hydroxyl group are 2-hydroxyethyl methacrylate, hydroxypropyl methacryate, 2-hydroxyethyl acrylate, hydroxypropyl acrylate, N-methylolacryl amide and N-methylolmethacryl amide, etc. Example of the monomer having an amino group are an acryl amide, etc.; and Examples of the monomer having an epoxy group are glycidyl methacrylate, allylglycidyl ether, etc.

These functional vinyl type monomers may be used singly or in combination of two or more kinds thereof and mixed in an amount of 0.1 to 10% by weight, preferably 0.5 to 5% by weight, of the monomers constituting the copolymer (A) which is an adhesive. Since said monomers are the components to be formulated for the purpose of controlling the adhesiveness and cohesiveness of the adhesive and also providing a point of cross-linking with the cross-linking agent, the primary tack of the adhesive may be lowered if they are copolymerized in a large amount.

The copolymer (A) may be prepared in accordance with either method of emulsion polymerization or solution polymerization. The solution polymerization method, however, is preferred in view of saving a procedure of preparing an organic solvent solution by a solvent substitution of an aqueous medium, considering the fact that in the subsequent mixing procedures the copolymers (A) and (B) are mixed and then the cross-linking agent is mixed.

In cases where the emulsion polymerization is employed, for example, an emulsifying agent having concentration which is higher than the critical micelle concentration (e.g., sodium dodecylbenzenesulfonate or sodium nonylnaphthalenesulfonate) may be added. Subsequently the monomer components (a) and (b) may be gradually added to the dispersion medium under stirring, followed by addition of a polymerization initiator (e.g., sodium persulfate, ammonium persulfate or potassium persulfate), and then the resultant mixture may be continuously stirred usually at 60° to 95° C. for 3 to 24 hours to obtain a solution of an emulsion of copolymer (A). On the other hand, in cases where the solution polymerization is employed, the monomer components (a) and (b) may be added to an organic solvent such as toluene, n-hexane, cyclohexane, ethyl acetate, benzene, acetone, methylethyl ketone, etc. Subsequently a polymerization initiator (e.g., benzoyl peroxide, lauroyl peroxide or dicumyl peroxide) may be added, followed by stirring continuously usually at 60° to 95° C. for 3 to 24 hours to obtain a solution containing the copolymer (A).

The copolymer (B) which constitutes the elastic micro-balls included in the adhesive composition of this invention may be prepared by use of two kinds of monomers, the above-mentioned component (a) and α-monoolefinic carboxylic acid (c). As the component (a), there may be used the ones described before, singly or in combination of two or more kinds thereof. The component may be mixed in an amount of 90 to 99.9% by weight, preferably 95 to 99.5% by weight, of all the monomers in the copolymer (B) which is the elastic micro-balls.

On the other hand, examples of the α-monoolefinic carboxylic acid of the component (c), are acrylic acid, methacrylic acid, itaconic acid, crotonic acid, etc. The component may be used singly or in combination of two or more kinds thereof and mixed in an amount of 0.1 to 10% by weight, preferably 0.5 to 5% by weight of the monomers constituting the copolymer (B). The component (c) is the one which may be employed for copolymerization for the purpose of providing a point of cross-linking with the cross-linking agent. When the amount of formulation of the component (c) is more than 10% by weight, the glass transition point of the copolymer (B) may exceed 10° C., and consequently the copolymer may fail to exhibit elasticity at ordinary temperature; when it is less than 0.1% by weight, the points of cross-linking may become too small in number.

The copolymer (B) may be prepared by suspension polymerization using an aqueous medium (preferably an ion-exchange water) because it must be obtained in the form of granules having a mean particle diameter of 0.5 to 300 μm, preferably 1 to 100 μm, for the purpose of forming an adhesive layer whose surface is appropriately uneven when applied on a substrate. The granules must possess a cushion action with a high viscoelasticity. Accordingly, the glass transition point thereof must be 10° C. or less, preferably 5° C. or less. Elastic micro-balls comprising the copolymer (B) may be prepared by gradually adding the above-mentioned monomer components and a polymerization initiator (e.g., benzoyl peroxide, lauroyl peroxide or dicumyl peroxide) to an aqueous medium, in which a surface active agent (e.g., sodium dodecylbenzenesulfonate, sodium polyacrylate, sodium nonylnaphthalenesulfonate) has been added to give concentration which is higher than the critical micelle concentration, and then subjecting the reaction system to polymerization reaction while stirring and usually at 60° to 95° C. for 3 to 24 hours.

The polyfunctional cross-linking agent (C) in the present adhesive composition may be selected depending on the functional group in the copolymers (A) and (B). Namely, the polyfunctional cross-linking agent may be used which may react simultaneously with both of a carboxyl group, which is a functional group in the copolymer (B), and a carboxyl group, a hydroxyl group, an amino group or an epoxy group which is a functional group in the copolymer (A). Example of the cross-linking agent are polyisocyanate series compounds, polyepoxy series compounds, polyfunctional aziridine series compounds, etc.

Here, typical examples of the polyisocyanate series compounds are toluylene diisocyanate, hexamethylene diisocyanate, diphenylmethane diisocyanate, isophorone diisocyanate, 1,5-naphthylene diisocyanate, etc.

Typical examples of the polyepoxy series compounds are ethylene glycol diglycidyl ether, propylene glycol diglycidyl ether, 1,6-hexanediol diglycidyl ether, etc.

Typical examples of the polyfunctional aziridine series compounds are compounds represented by the following formulas:

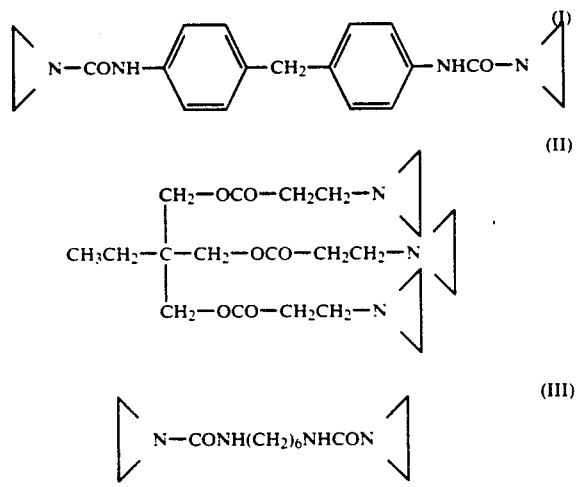

In the adhesive composition according to this invention, 20 to 1,000 parts by weight, preferably 20 to 500 parts by weight, of the copolymer (B) and 0.01 to 5 parts by weight, preferably 0.05 to 3 parts by weight, of the cross-linking agent (C) may be mixed based on 100 parts by weight of the copolymer (A). When the amount of the copolymer (B) is less than 20 parts by weight, the adhesive layer may become almost smooth to make the removal of the adhesive sheet difficult and the removability thereof may be lowered; when the amount of the copolymer (B) is more than 1,000 parts by weight, the surfaces of micro-balls, by which the surface of the adhesive layer is formed unevenly, may not be completely covered with the adhesive to make difficult a secured bonding of the adhesive sheet to an adherend. When the amount of the cross-linking agent (C) is less than 0.01 part by weight, the effect of cross-linking may not be exhibited to lower the removability of the sheet, on the other hand, when it is more than 5 parts by weight, cross-linking may proceed excessively to lower the adhesiveness undesirably.

Here, the present composition having the composition mentioned above may be prepared according to the method of preparing the copolymer (A) with some different procedures.

When the copolymer (A) has been prepared by emulsion copolymerization, the emulsion solution of copolymer (A) and the polymer suspension of copolymer (B) may be mixed so that the weight ratio of the copolymer (B) may be 20 to 1,000 parts by weight relative to 100 parts by weight of the copolymer (A) when calculated in terms of the amount of the polymer components per se. In this instance, it is preferred that both of the solutions are adjusted to have a pH almost equal to each other.

Subsequently, an organic solvent such as methanol, acetone, or a mixture thereof may be prepared in an amount larger than the equivalent volume of the mixed solution, of copolymers (A) and (B). Into the organic solvent, with vigorous stirring, may be poured the mixed solution of copolymers (A) and (B) to separate a mixed body of said polymer components (A) and (B) from an aqueous medium by precipitation. The precipitation separation of the mixed body of the polymers (A) and (B) may be carried out by placing it into an excess amount of alcohols or ketones, followed by stirring.

The thus separated copolymer mixture may be separated by filtration through a filter cloth to remove the solvent components such as water, methanol, acetone, etc., the emulsifying agent, the polymerization initiator, unreacted monomer component, etc. The above-mentioned procedure for removing the solvent components, etc. is necessary for preventing an unfavorable influence by them on the adhesiveness of the sheet. The components of copolymers (A) and (B) left on the filter cloth may be immediately dispersed by stirring in an organic solvent, such as toluene, n-hexane, n-heptane, etc., so that the solution may have a predetermined concentration. Further, by adding a predetermined amount of the cross-linking agent (C) to the thus obtained solution with stirring, a homogeneous liquid dispersion of the desired removable adhesive composition may be obtained. The thus prepared solution is a homogemeous liquid dispersion whose concentration may not change with the lapse of time after preparation thereof.

On the other hand, when the copolymer (A) has been prepared by solution polymerization, an organic solvent such as methanol, acetone or a mixture thereof may be prepared in an amount larger than the equivalent volume of the polymer suspension of copolymer (B). To the organic solvent, with vigorous stirring, may be poured said polymer suspension to separate the composition of copolymer (B) by substitution. Subsequently, the copolymer thus separated may be filtered off through a filter cloth to remove the solvent components such as water, methanol, acetone, etc., the emulsifying agent, the polymerization initiator, unreacted monomer component, etc. The above-mentioned procedure for removing the solvent components, etc. is necessary for preventing an unfavorable influence by them on the adhesiveness of the sheet. The copolymer component (B) left on the filter cloth may be immediately dispersed by stirring in an organic solvent, such as toluene, n-hexane, n-heptane, etc. so that the solution may have a predetermined concentration. Next, by adding the predetermined amount of the solution containing copolymer (A) to the thus obtained solution with stirring, a homogeneous liquid dispersion may be obtained. Finally, by adding the predetermined amount of the cross-linking agent (C) a homogeneous liquid dispersion of the removable adhesive composition may be obtained. The thus obtained liquid dispersion maintains such a homogeneous dispersed state and does neither precipitate nor separate with the lapse of time after preparation thereof. However, in this instance, the polymerization solvent in the solution containing copolymer (A) may be possibly limited to an organic solvent, such as toluene, n-hexane, n-heptane, etc., which may not destroy the spherical granules comprising the component of copolymer (B); even when such an organic solvent which may destroy the spherical granules is to be included, the amount thereof should be 20% by weight or less, preferably 10% by weight or less, of all the solvents to be employed.

The above-described composition is especially useful as an adhesive for use in a removable adhesive sheet or tape. As a substrate to be used for a sheet or a tape to which the adhesive composition of this invention can be applied, there may be used, for example, a smooth film or sheet made of polyethylene, polypropylene, polyester, polyvinyl chloride, cellulose acetate, polycarbonate, cellophane, polyvinylidene fluoride or a composite substrate thereof in addition to such a substrate made of a fibrous material as paper, cloth, non-woven fabric, etc.

The composition of this invention may be applied by coating to the above-mentioned substrate on its one side to be coated with the adhesive, with the amount in the range of 0.1 to 100 g/m$^2$, preferably 1 to 30 g/m$^2$. After coating the sheet or tape is heated usually at 50° to 140° C. for 0.1 to 30 minutes so that the cross-linking agent (C) may react, in the adhesive composition, with functional groups of the copolymers (A) and (B) to be bonded to each other. In this instance, if the substrate component itself has a reactive group which can react with the cross-linking agent, said substrate can be chemically bonded to the adhesive comprising the copolymer (A) and the elastic micro-balls comprising the copolymer (B). Further, the adhesive composition can also be bonded to the substrate more strongly by the anchor effect. In the composition of this invention, a catalyst such as an imidazole compound, an organic metal compound, etc. may be mixed in an amount of 5 parts by weight or less based on 100 parts by weight of the copolymer (A) in order to accelerate the above-mentioned cross-linking reaction.

Thus, when the adhesive composition of the present invention is used as an adhesive for removable adhesive sheet or tape, the adhesive may not remain on the surface of an adherend when removed, due to its very high cohesiveness. This is because each component in said composition is not only chemically bonded to other components but also bonded strongly to the substrate by the anchor effect accompanied, in some cases, with the chemical bonding. Further, elastic micro-balls, which have tactual softness and can exhibit viscoelastic action, form the protrusive portions of the adhesive layer and may be bonded by the so-called point adhesion to an adherend thereby. Accordingly, since said sheet has a high primary tack and also the surface of the adhesive may not be in contact with the adherend with its entire surface, the sheet may be readily removed therefrom. Moreover, the surfaces of the elastic micro-balls are completely covered with the adhesive, thus making the adhesiveness of the sheet very high.

The adhesive composition of this invention may exhibit high cohesive force, since it contains a polyfunctional cross-linking agent and a copolymer which may react with the cross-linking agent. And, due to the fact that the elastic micro-balls with high viscoelasticity, whose surfaces are covered with the adhesive, are formulated in the adhesive composition, the adhesive composition of this invention is excellent not only in its primary tack but also in adhesiveness and removability.

Accordingly, the composition of this invention is quite useful as a removable adhesive composition to be applied on the surface of a sheet or a tape.

This invention will be further described by the following Examples.

EXAMPLE 1

A one liter-reaction vessel equipped with a thermometer, a speed variable stirrer, a nitrogen introducing pipe and a reflux condensing pipe was prepared, into which 150 g of distilled water and 2 g of sodium dodecylbenzene-sulfonate were charged. After replacement of the internal air of the vessel with nitrogen gas, the contents were stirred at 300 r.p.m. in a fixed amount of nitrogen stream. Next, 44 g of 2-ethylhexyl acrylate, 54 g of butyl acrylate and 2 g of acrylic acid were weighed separately and then mixed homogeneously. The mixture thus obtained was added dropwise to the above reaction vessel for its emulsification. After the dropwise addition was completed, the emulsion thus obtained was heated until the liquid temperature reached to 65° C., whereat 30 ml of 1% ammonium persulfate solution was added dropwise thereto to initiate polymerization. While maintaining the liquid temperature at 80° to 85° C. the reaction was carried out for 5 hours to obtain an emulsion of copolymer (A).

Subsequently, another one liter-reaction vessel equipped with a thermometer, a speed variable stirrer, a nitrogen introducing pipe and a reflux condensing pipe was prepared, into which 250 g of distilled water, 5 g of sodium dodecylbenzenesulfonate and 0.5 g of sodium polyacrylate were charged. After replacement of the internal air of the vessel with nitrogen gas, the contents were stirred at 100 r.p.m. in a fixed amount of nitrogen stream to make a homogeneous solution, and then the liquid temperature was raised to 65° C. Next, a homogeneously mixed solution of 98 g of isononyl acrylate, 2 g of acrylic acid and 0.3 g of benzoyl peroxide was added dropwise to the above mentioned aqueous solution with stirring at 500 r.p.m. to initiate polymerization reaction. After the dropwise addition was completed, the internal temperature of the vessel was raised gradually and the reaction was carried out at 80° to 85° C. for 5 hours. Although the reaction had almost been completed, the reaction was further carried out 3 hours to obtain a polymer suspension of copolymer (B).

Subsequently, after the revolution of stirring was reduced to 200 r.p.m. and 100 g of this polymer suspension which had been cooled down to ordinary temperature was weighed out to a 500 ml beaker, 50 g of the emulsion of copolymer (A) was weighed out while stirring using a stirrer and then admixed therewith, followed by stirring for 30 minutes. Next, into a one liter-beaker containing a mixed solvent of 100 ml of acetone and 100 ml of methanol the above mixed solution was poured with stirring at 300 r.p.m. This liquid mixture was filtered through a filter cloth to separate the polymer components from the aqueous medium for precipitation. The polymer components were taken up in 450 g of toluene which had been weighed out to another one liter-beaker and stirred to obtain a homogeneous liquid dispersion.

This liquid dispersion is a mixed liquid dispersion containing about 10% of the copolymers (A) and (B) with a weight ratio of A/B=5/7. To facilitate the description in the following Examples and Comparative Examples, the mixed liquid dispersion is hereinafter referred to as Solution (AB-1).

20 g of Solution (AB-1) was weighed out to measure the concentration of the solid content by an absolute dry method. The concentration thereof was found to be 9.2%. Then 200 g of Solution (AB-1) was weighed out to a 500 ml beaker, and 36 mg of Epikote 812 (trademark, produced by Yuka Shell Epoxy K.K.) and 36 mg of 1,8-diazacyclo [5.4.0]undecene-7 were weighed out and admixed therewith homogeneously. The liquid mixture thus obtained was applied on the surface of a 70 $g/m^2$ woodfree paper by use of an applicator so that the spread of the adhesive composition after drying may be 7 $g/m^2$, followed by heat treatment in the air of a thermostatic chamber kept at 120° C. for 5 minutes to obtain an adhesive sheet.

After the thus obtained sample was left to stand in the thermostatic chamber at 23° C.-65% RH for 24 hours, the primary tack and the removability of the sheet were tested. The adhesiveness was measured to be 120 g/0.5 cm (diameter) by use of a POLYKEN PROBE TACK TESTER (Trademark, produced by The Kendall Company) which is a tester for primary tack value. Measurement was carried out according to the methods described in F. H. Hammond Jr., ASTM Bulletin, No. 360, 122-133 (Published by ASTM), and Kamagata, Saito and Toyama, Nihon Setchaku Kyokaishi (Journal Adhesive Association), Vol. 5, No. 6, 365, (1969). On the other hand, a piece of adhesive sheet of 12 mm in width and 10 cm in length was cut out and adhered with pressure to the surface of a newspaper which had been adhered to a bakelite plate of 50 mm in width, 125 mm in length×2 mm in thickness by use of a double side adhesive tape. The sheet was further adhered firmly by reciprocating a 2 kg rubber roller once over its surface. The adhesive force at 180° peeling of the adhesive sheet (cross-head speed: 300 mm/min.) was measured to be 110 g/12 mm by use of a universal tensile tester. A procedure of adhering the piece of adhesive sheet to the surface of a woodfree paper by pressing it with an index finger lightly and removing therefrom slowly 1 to 2 seconds later was repeated 50 times. The adhesive force of the sheet at 180° peeling to a newspaper at this point was measured to be 85 g/12 mm. Further, when the same procedure mentioned above was repeated 100 times, the adhesive force of the sheet at 180° peeling was measured to be 75 g/12 mm. The adhesive sheet used for the above test was adhered again to a newspaper posted with a cellophane tape on a wall. Having observed 5 hours later, there was no peeling off of the edge nor falling off of the sheet.

COMPARATIVE EXAMPLE 1

The remaining liquid of Solution (AB-1) (to which no cross-linking agent had been added) was applied on the surface of the 70 $g/m^2$ of a woodfree paper by use of an applicator in the same manner as in Example 1 and the spread of the adhesive composition was adjusted to be 7 $g/m^2$ after drying, followed by hot-air dry treatment at 120° C. for 5 minutes. After being left to stand overnight in an air- and humidity-conditioned room at 23° C.-65% RH, the adhesiveness and removability of the thus obtained sheet were tested.

The primary tack was measured to be 130 g/0.5 cm (diameter) by use of a POLYKEN PROBE TACK TESTER (trademark, produced by The Kendall Company). The adhesive force at 180° peeling, to a newspaper, was measured to be 110 g/12 mm. There was observed some fibers of the newspaper sticking on the surface of the adhesive layer of the sheet. When a procedure of adhering and removing of the sheet was repeated on a woodfree paper, the sheet almost failed to be adhered thereto at 19 time repetitions. The sheet was further adhered with pressure to a newspaper posted on a wall. Although the sheet could somehow be adhered, it fell off after 5 hours.

COMPARATIVE EXAMPLE 2

A 50 g emulsion of copolymer (A) and 100 g of the polymer suspension of copolymer (B), having been prepared in Example 1, were weighed out to a beaker, followed by mixing with stirring for 30 minutes to obtain a homogeneous solution. Following the same manner as in Comparative Example 1, the solution thus obtained was applied on the surface of the 70 g/m$^2$ of woodfree paper by use of an applicator so that the spread thereof after drying may be 7 g/m$^2$, followed by hot-air dry treatment at 120° C. for 5 minutes to obtain a piece of adhesive sheet. After the sheet being left to stand overnight in an air- and humidity-conditioned room, the adhesiveness and the removability of the sheet were tested.

The primary tack was measured to be 90 g/0.5 cm (width) by use of a POLYKEN PROBE TACK TESTER (trademark, produced by The Kendall Company). The adhesive force of the sheet to a newspaper was measured to be 85 g/12 mm following the same measuring procedure as in Comparative Example 1, which value being a little bit lower as compared with the one in Example 1. The sample thus obtained was determined to be unsuitable to be used for a memo pad with adhesive, etc. because the substratial woodfree paper had been coated with the adhesive composition using a water solvent and the water had permeated the substrate to make the surface thereof unsmooth even after drying. When a procedure of bonding and removing to a woodfree paper was repeated according to the above-described examples, the sheet almost failed to be adhered to the wordfree paper after 35 times repetitions. The piece of this sheet was further adhered to a newspaper posted on a wall. The adhesion of the sheet was unstable and it fell off after 90 minutes.

From these results, it is considered that the residual surface active agent, emulsion stabilizer, etc. having been incorporated at the time of emulsion polymerization and suspension polymerization give unfavorable influence on the adhesiveness of the sheet. The use of a water solvent may cause some technical limitation on the addition of a cross-linking agent, such that; (1) employment of a polyisocyanate compound may be difficult because it may easily react with water; (2) cross-linking reaction may be hardly effected because the amounts of the emulsifying agent, the surface active agent, etc. to be employed are relatively large; (3) it is often more advantageous not to use an aqueous medium because most of the cross linking catalysts have a strong reactivity with water.

When the surfaces of the adhesive layers formed on the adhesive sheets obtained in Example 1, Comparative Examples 1 and 2 were observed by use of an optical microscope, there was confirmed such structure in each of these sheets that micro-balls are distributed in a substantially single layer on the surface of the substantial paper being covered with a film of the adhesive.

As a result, the present inventors have confirmed that an idealistic bond may be obtained between an adhesive and micro-balls, between the adhesive and a substrate and between the micro-balls and the substrate, by the combined use of the micro-balls rich in elasticity with the adhesive according to the present invention and by the chemical bonding force attained by the cross-linking agent, thereby making it possible to obtain an excellent removable adhesive sheet. They have also confirmed that the adhesive composition of the present invention is idealistic when used as an adhesive for forming a memo pad with adhesive.

EXAMPLE 2

A one liter-flask equipped with a thermometer, a reflux condenser, a nitrogen introducing pipe and a speed variable mixer was provided, and 50 g of toluene, 50 g of n-hexane, 85 g of isononyl acrylate, 13 g of ethyl acrylate and 2 g of acrylic acid were weighed out and put in the flask. While setting the revolution of the mixer at 150 r.p.m. the internal air of said flask was replaced by nitrogen. Subsequently, while passing a fixed amount of nitrogen gas, the temperature was gradually raised to 65° C. Next, 3 g of 1% toluene solution of benzoyl peroxide (hereinafter merely referred to as BPO), which had been previously prepared, was added dropwise into the flask to initiate polymerization. Since the liquid temperature starts to rise with the initiation of polymerization, the reaction was carried out while maintaining the liquid temperature at 80° to 85° C. by controlling the temperature of water bath, during which 3 g of the 1% toluene solution of BPO were added at intervals of 30 minutes until the total amount of BPO liquid added reached 30 g. Although the reaction was almost completed five hours after the initiation of polymerization, the liquid temperature was further maintained at 80° to 85° C. for another 3 hours to carry on the polymerization. Subsequently, the resulting solution was diluted by adding 100 g of toluene with stirring continuously and cooled down to ordinary temperature to obtain a 30% solution of the copolymer (A).

On the other hand, 100 g of a polymer suspension of the copolymer (B) having been obtained in the same manner as in Example 1 was weighed out and added dropwise to 100 g of acetone in a 500 ml beaker with stirring at 300 r.p.m. to obtain copolymer (B) whose aqueous medium being subjected by solvent-substitution with an acetone. The copolymers (B) were filtered off using a filter cloth and then immersed together with the filter cloth in 200 g of acetone in another 500 ml beaker for 30 minutes to extract surface active agent, polymerization initiator, unreacted monomers, water content, etc.

The copolymer (B) obtained after such treatment was taken up in a 500 ml beaker to which 50 g of 30% solution of the copolymer (A) and 350 g of toluene had been weighed out, and then mixed with stirring for 30 minutes to obtain a homogeneous liquid dispersion. To facilitate the following explanations, the liquid dispersion thus obtained may be hereinafter referred to as Dispersion (AB-2). A part of Dispersion (AB-2) was weighed out to measure the concentration by an absolute dry method. The solids content thereof was measured to be 10.0%.

200 g of Dispersion (AB-2) was weighed out to a beaker, to which was added 0.2 g of Colonate L (trademark, produced by Nippon Polyurethane K.K.) as a polyfunctional isocyanate compound and the mixture was stirred for 30 minutes to obtain a homogeneous dispersion including a cross-linking agent. Subsequently, in the same manner as in Example 1, the liquid dispersion was applied to the surface of a 70 g/m$^2$ woodfree paper by use of an applicator so that the spread thereof after drying may be 7 g/m$^2$, followed by hot-air dry treatment at 120° C. for 5 minutes to obtain an adhesive sheet.

After leaving the thus obtained sheet in an air- and humidity-conditioned room overnight, sample pieces of 25 mm (width)×20 cm and 12 mm (width)×10 cm, respectively, were cut out therefrom. The primary tack of each sample piece was measured to be 115 g/0.5 cm (diameter) using a POLYKEN PROBE TACK TESTER (trademark, produced by The Kendall Company) The adhesive force to a newspaper was measured to be 120 g/12 mm at the initial stage; 90 g/12 mm, after repeating 50 times of bonding and removing to and from a woodfree paper; and 80 g/12 mm, after repeating 100 times of bonding and removing to and from the woodfree paper. Adhesion of the sample pieces against a newspaper posted on a wall proved to be excellent and there was not observed any falling off of the pieces.

COMPARATIVE EXAMPLE 3

An adhesive sheet was prepared in the same manner as in Comparative Example 1 except that an isocyanate series cross-linking agent was not added to Dispersion (AB-2).

The primary tack of the thus obtained sheet was measured to be 125 g/0.5 cm (diameter). The adhesive force to a newspaper was 115 g/12 mm at the initial stage. However, after bonding and removing was repeated 27 times to and from the woodfree paper, adhesiveness of the sheet had been almost lost. When the sheet was adhered to a newspaper posted on a wall, it fell off soon without being adhered thereto any larger.

COMPARATIVE EXAMPLE 4

An adhesive sheet was prepared by applying 30% solution of the copolymer (A) obtained in Example 2 on the surface of a 70 g/m² woodfree paper by use of an applicator so that the spread thereof after drying may be 7 g/m², followed by hot-air dry treatment at 120° C. for 5 minutes.

The adhesive properties of the thus obtained adhesive sheet were measured. As a result, the primary tack thereof was measured to be 220 g/0.5 cm (width) by use of a POLYKEN PROBE TACK TESTER (trademark, produced by The Kendall Company). When the sheet was adhered to a newspaper and then peeled off, the adhesion of the sheet to the newspaper was so strong that the newspaper was teared off on removal of the sheet.

As is obvious from the facts mentioned above, it has been proved that the structure wherein the elastic micro-balls which is the copolymer (B) is covered with the adhesive which is the copolymer (A), according to the present invention, and the chemical bonds of these two copolymers (A) and (B), and of the copolymers (A) and (B) respectively with the substrate by use of a cross-linking agent have enabled the adhesive composition of the present invention to possess excellent removability.

EXAMPLE 3

200 g of Dispersion (AB-1) obtained in the same manner as in Example 1 was weighed out to a 500 ml beaker, to which was added 92 mg of aziridine compound (I) (trademark: Chemitite DZ-22, produced by Nihon Shokubai Kagaku K.K.), followed by mixing homogeneously. This liquid mixture was applied to the surface of a 70 g/m² woodfree paper by use of an applicator so that the spread of the adhesive composition after drying may be 7 g/m², followed by heat treatment at 120° C. for 5 minutes to obtain an adhesive sheet.

After the thus obtained sample sheet being left to stand for 24 hours in an air- and humidity-conditioned room of 23° C.-65% RH, the adhesiveness and removability of the sheet were tested. The primary tack of the sheet was measured to be 120 g/0.5 cm (diameter) by use of a POLYKEN PROBE TACK TESTER (trademark, produced by The Kendall Company); and the adhesive force to a newspaper was measured to be 105 g/12 mm. The adhesive forces to a newspaper at the time of repeating of bonding and removing 50 times and 100 times to and from a woodfree paper were measured to be 80 g/12 mm and 70 g/12 mm, respectively. The adhesive sheet used for the above test was re-adhered to a newspaper posted on a wall. At the observation of 5 hours later, there was not observed any peeling off of the edge nor falling off of the sheet from the newspaper.

We claim:

1. A removable adhesive composition comprising:
   about 100 parts by weight of a copolymer (A) which is tacky at ordinary temperature, and comprises:
   from about 90 to about 99.9% by weight of a nonfunctional vinyl monomer (a) which comprises an acrylate or methacrylate ester having an alkyl group having from 2 to 12 carbon atoms, and
   from about 0.1 to about 10% by weight of a functional vinyl monomer (b) having at least one of a carboxyl group, a hydroxyl group, an amino group and an epoxy group;
   from about 20 to about 1,000 parts by weight of a copolymer (B) having a glass transition point of at most about 10° C. and being in the form of microballs having a mean particle diameter of from about 0.5 to about 300 μm, and comprising:
   from about 90 to about 99.9% by weight of a nonfunctional vinyl monomer (a) which comprises an acrylate or methacrylate ester having an alkyl group having from 2 to 12 carbon atoms, and
   from about 0.1 to about 10% by weight of an α-monoolefinic carboxylic acid (c); and from about 0.01 to about 5 parts by weight of a polyfunctional cross-linking agent (C) which is capable of reacting with the functional groups of said components (b) and (c), wherein the surfaces of said copolymer (B) are substantially covered by said copolymer (A), and wherein the adhesive composition may be readily adhered to an adherend with a slight pressure and removed therefrom without damaging the surface of the adherend or leaving adhesive on the surface of the adherend.

2. The removable adhesive composition according to claim 1, wherein said nonfunctional vinyl monomer (a) is a member selected from the group consisting of ethyl acrylate, propyl acrylate, n-butyl acrylate, isobutyl acrylate, n-octyl acrylate, isooctyl acrylate, 2-ethylhexyl acrylate, nonyl acrylate, isononyl acrylate, lauryl acrylate, methyl methacrylate, ethyl methacrylate, propyl methacrylate, butyl methacrylate, 2-ethylhexyl methacrylate, isononyl methacrylate and lauryl methacrylate.

3. The removable adhesive composition according to claim 1, comprising from about 95 to about 99.5% by weight of said nonfunctional vinyl monomer (a).

4. The removable adhesive composition according to claim 1, wherein said functional vinyl monomer (b) is a member selected from the group consisting of acrylic acid, methacrylic acid, itaconic acid, crotonic acid, maleic acid, 2-hydroxyethyl methacrylate, hydroxypropyl methacrylate, 2-hydroxyethyl acrylate, hydroxypropyl acrylate, N-methylolacryl amide and N- methylolmethacryl amide, acryl amide, glycidyl methacrylate and allyl-glycidyl ether.

5. The removable adhesive composition according to claim 1, wherein said copolymer (A) comprises from about 0.5 to about 5% by weight of said functional vinyl monomer (b).

6. The removable adhesive composition according to claim 1, wherein said polymer (A) is prepared by emulsion polymerization or solution polymerization.

7. The removable adhesive composition according to claim 6, wherein said copolymer (A) is prepared by a solution polymerization method.

8. The removable adhesive composition according to claim 1, wherein said copolymer (B) comprises from about 95 to about 99.5% by weight of said component (a).

9. The removable adhesive composition according to claim 1, wherein said copolymer (B) comprises from about 0.5 to about 5% by weight of said component (c).

10. The removable adhesive composition according to claim 1, wherein the mean particle diameter of the copolymer (B) is from about 1 to about 100 μm.

11. The removable adhesive composition according to claim 1, wherein polyfunctional cross-linking agent is a member selected from the group consisting of a polyisocyanate (C) compound, polyepoxy series compound and a polyfunctional aziridine series compound.

12. The removable adhesive composition according to claim 1, wherein said composition comprises from about 20 to about 1,000 parts by weight of said copolymer (B) and from about 0.01 to about 5 parts by weight of said cross-linking agent relative to 100 parts by weight of said copolymer (A), respectively.

13. The removable adhesive composition according to claim 12, wherein said composition comprises from about 20 to about 500 parts by weight of said copolymer (B), and from about 0.5 to about 3 parts by weight of said cross-linking agent, relative to 100 parts by weight of said copolymer (A), respectively.

14. A removable adhesive composition consisting essentially of:
   about 100 parts by weight of a copolymer (A) which is tacky at ordinary temperature, consisting essentially of:
      from about 90 to about 99.9% by weight of a non-functional vinyl monomer (a) which consists essentially of an acrylate or methacrylate ester having an alkyl group having from 2 to 12 carbon atoms, and
      from about 0.1 to about 10% by weight of a functional vinyl monomer (b) having at least one of carboxyl group, a hydroxyl group, an amino group and an epoxy group;
   from about 20 to about 1,000 parts by weight of a copolymer (B) having a glass transition point of at most about 10° C. and having a mean particle diameter of from about 0.5 to about 300 μm, and comprising essentially of:
      from about 90 to about 99.9% by weight of a non-functional vinyl monomer (a) which consists essentially of an acrylate or methacrylate ester having an alkyl group having from 2 to 12 carbon atoms, and
      from about 0.1 to about 10% by weight of an α-monoolefinic carboxylic acid (c); and
   from about 0.01 to about 5 parts by weight of a polyfunctional cross-linking agent (C) which is capable of reacting with the functional groups of said components (b) and (c), wherein the surfaces of said copolymer (A), and wherein the adhesive composition may be readily adhered to an adherend with a slight pressure and removed therefrom without damaging the surface of the adherend or leaving adhesive on the surface of the adherend.

15. A removable adhesive composition consisting essentially of:
   about 100 parts by weight of a copolymer (A) which is tacky at ordinary temperature, consisting essentially of:
      from about 90 to about 99.9% by weight of a non-functional vinyl monomer (a) which consists essentially of an acrylate or methacrylate ester having an alkyl group having from 2 to 12 carbon atoms, and
      from about 0.1 to about 5% by weight of a functional vinyl monomer (b) having at least one of a carboxyl group, a hydroxyl group, an amino group and an epoxy group;
   from about 20 to about 500 parts by weight of a copolymer (B) having a glass transition point of at most about 10° C. and being in the form of microballs having a mean particle diameter of from about 0.5 to about 300 μm, and consisting essentially of:
      from about 90 to about 99.9% by weight of a non-functional vinyl monomer (a) which consists essentially of an acrylate or methacrylate ester having an alkyl group having from 2 to 12 carbon atoms, and
      from about 0.5 to about 5% by weight of an α-monoolefinic carboxylic acid (c); and
   from about 0.05 to about 3 parts by weight of a polyfunctional cross-linking agent (C) which is capable of reacting with the functional groups of said components (b) and (c), wherein the surfaces of said copolymer (B) are substantially covered by said copolymer (A), and wherein the adhesive composition may be readily adhered to an adherend with a slight pressure and removed therefrom without damaging the surface of the adherend or leaving adhesive on the surface of the adherend.

* * * * *